United States Patent
Rossi

(10) Patent No.: US 9,594,421 B2
(45) Date of Patent: Mar. 14, 2017

(54) POWER MANAGEMENT IN A MULTI-DEVICE STORAGE ARRAY

(75) Inventor: Robert P. Rossi, Altamonte Springs, FL (US)

(73) Assignee: Xyratex Technology Limited, Havant (GB)

( * ) Notice: Subject to any disclaimer, the term of this patent is extended or adjusted under 35 U.S.C. 154(b) by 887 days.

(21) Appl. No.: 13/042,938

(22) Filed: Mar. 8, 2011

(65) Prior Publication Data

US 2012/0233484 A1  Sep. 13, 2012

(51) Int. Cl.
*G06F 1/32* (2006.01)
*G06F 3/06* (2006.01)

(52) U.S. Cl.
CPC ............ *G06F 1/3268* (2013.01); *G06F 3/067* (2013.01); *G06F 3/0625* (2013.01); *G06F 3/0634* (2013.01); *G06F 3/0647* (2013.01); *G06F 3/0689* (2013.01); *Y02B 60/1246* (2013.01)

(58) Field of Classification Search
CPC ........ G06F 1/32; G06F 1/3215; G06F 1/3221; G06F 1/3225; G06F 1/325; G06F 1/3268; G06F 3/0625; G06F 3/0629; G06F 3/0631; G06F 3/0632; G06F 3/0634; G06F 3/0647; G06F 3/1221; G06F 11/2089; G06F 11/2094
USPC ................ 713/300, 310, 320–324, 330, 340
See application file for complete search history.

(56) References Cited

U.S. PATENT DOCUMENTS

| | | | |
|---|---|---|---|
| 5,423,046 A | 6/1995 | Nunnelley et al. | |
| 5,546,558 A | 8/1996 | Jacobson et al. | |
| 5,666,512 A | 9/1997 | Nelson et al. | |
| 5,900,007 A | 5/1999 | Nunnelley et al. | |
| 6,961,815 B2 | 11/2005 | Kistler et al. | |
| 7,035,972 B2 | 4/2006 | Guha et al. | |
| 7,152,142 B1 | 12/2006 | Guha et al. | |
| 7,181,477 B2 * | 2/2007 | Saika et al. | |
| 7,210,005 B2 | 4/2007 | Guha et al. | |
| 7,222,216 B2 | 5/2007 | Guha et al. | |
| 7,330,931 B2 | 2/2008 | Le et al. | |
| 7,398,418 B2 | 7/2008 | Soran et al. | |
| 2003/0193732 A1* | 10/2003 | Hakamata | G11B 19/20 360/69 |
| 2005/0289361 A1* | 12/2005 | Sutardja | 713/300 |
| 2007/0143541 A1* | 6/2007 | Nichols | G06F 11/1084 711/114 |
| 2010/0070731 A1* | 3/2010 | Mizuno et al. | 711/170 |

(Continued)

*Primary Examiner* — Fahmida Rahman
(74) *Attorney, Agent, or Firm* — Hall Estill Attorneys at Law

(57) ABSTRACT

There is provided a method and apparatus for power management in a storage resource. The storage resource comprises at least one RAID array including a plurality of physical drives. The method comprises: determining a reduced number of physical drives within a RAID array upon which data is to be concentrated; moving data stored on said RAID array and/or targeting data written to said RAID array to one or more of said reduced number of physical drives such that said data is concentrated on said reduced number of physical drives in said RAID array; and selectively applying power management logic to enable, based on at least one power management criterion, one or more physical drives in said RAID array to be powered down or to be supplied with reduced power.

19 Claims, 8 Drawing Sheets

(56) References Cited

U.S. PATENT DOCUMENTS

2010/0115310 A1* 5/2010 Kubota ................ G06F 3/0625
  713/320
2011/0258405 A1* 10/2011 Asaki et al. ................... 711/162
2012/0023292 A1*  1/2012 Saito et al. .................... 711/114
2012/0054430 A1*  3/2012 Iwamitsu ...................... 711/114

* cited by examiner

POWER MANAGEMENT IN A MULTI-DEVICE STORAGE ARRAY

The present invention relates to a method of, and apparatus for, management of power in a storage resource. More particularly, the present invention relates to a method of, and apparatus for, management of power in a storage resource comprising at least one RAID array.

Commonly, redundant arrays of inexpensive disk (RAID) arrays are the primary storage architecture for large, networked computer storage systems. The RAID architecture was first disclosed in "A Case for Redundant Arrays of Inexpensive Disks (RAID)", Patterson, Gibson, and Katz (University of California, Berkeley). RAID architecture combines multiple small, inexpensive disk drives into an array of disk drives that yields performance exceeding that of a single large drive.

There are a number of different RAID architectures, designated as RAID-1 through RAID-6. Each architecture offers disk fault-tolerance and offers different trade-offs in terms of features and performance. In addition to the different architectures, a non-redundant array of disk drives is referred to as a RAID-0 array. RAID controllers provide data integrity through redundant data mechanisms, high speed through streamlined algorithms, and accessibility to stored data for users and administrators.

RAID architecture provides data redundancy in two basic forms: mirroring (RAID 1) and parity (RAID 3, 4, 5 and 6). The implementation of mirroring in RAID 1 architectures involves creating an identical image of the data on a primary disk on a secondary disk. The contents of the primary and secondary disks in the array are identical.

RAID 1 architecture requires at least two drives and has increased reliability when compared to a single disk. Since each disk contains a complete copy of the data, and can be independently addressed, reliability is increased by a factor equal to the power of the number of independent mirrored disks, i.e. in a two disk arrangement, reliability is increased by a factor of four. Normally data is mirrored onto physically identical drives, though the process can be applied to logical drives where the underlying physical format is hidden from the mirroring process.

RAID 3, 4, 5, or 6 architectures generally utilise three or more disks of identical capacity. In these architectures, two or more of the disks are utilised for reading/writing of data and one of the disks stores parity data. Data interleaving across the disks is usually in the form of data "striping" in which the data to be stored is broken down into blocks called "stripe units". The "stripe units" are then distributed across the disks. Therefore, should one of the disks in a RAID group fail or become corrupted, the missing data can be recreated from the data on the other disks. The data may be reconstructed through the use of the redundant "stripe units" stored on the remaining disks. However, RAID architectures utilising parity configurations need to generate and write parity data during a write operation.

A RAID array is usually presented to the host user as one or more logical drives. A logical drive is a usable region of storage capacity located on one or more physical disk drive components in a computer system. The drive is referred to as logical (or, sometimes, virtual) because it does not actually form a physical entity in its own right, and may comprise, for example, a partition on one or more disks in a RAID array.

In most modern storage networks, a number of storage devices are connected to many host server devices in a storage network. A single RAID array may provide capacity to one or more servers.

Modern storage resources tend to be very large and consume a large amount of power. Therefore, there is considerable interest in power management protocols and implementations in order to reduce the power consumption of a storage resource.

However, to date, attempts to reduce the power consumption of large storage resources have been less than successful. One reason for this is that power management protocols often focus on industry-standard Application Programming Interfaces (APIs) within storage resources. Power management logic is then applied to the storage devices (which may comprise, for example, hard disk drives) within these storage resources unilaterally without discrimination. This is, generally, sub-optimal for RAID configurations.

As an example, consider the situation where conventional power management logic is applied to a RAID 0 array. Conventional logic involves spinning down each hard disk drive when not in use. Therefore, when there is no data access, all of the hard disk drives will be spun down. However, because the data is striped across all of the hard disk drives in the RAID array, whenever any data access occurs all of the drives will spin up and become operational.

Therefore, useful power savings can only be obtained if the drives are spun down when there is a long period of total inactivity on the RAID array. Such a situation is very uncommon in modern storage systems which are operational on an almost permanent basis. Consequently, attempts to apply conventional power management logic to large-scale RAID arrays offer little practical benefit.

Other known power management implementations are disclosed in: U.S. Pat. Nos. 5,666,512; 5,423,046; 5,900,007; 5,546,558; 6,961,815; 7,035,972; 7,210,005; 7,222,216; 7,152,142; 7,330,931; and 7,398,418. Some of these arrangements focus on the provision of separate RAID arrays (for example, a mirrored RAID array and a parity-based RAID array) and data is stored on each of these arrays such that not all of the drives forming these multiple array types need to be powered on at all times. However, these arrangements require different array types and may be complicated to maintain and organise.

As set out above, known power management arrangements suffer from a technical problem that, in a storage resource comprising one or more RAID arrays, no practical power savings can be obtained within a RAID array using conventional power management logic.

According to a first aspect of the present invention, there is provided a method for power management in a storage resource, the storage resource comprising at least one RAID array including a plurality of physical drives, the method comprising: determining a reduced number of physical drives, said reduced number being less that the total number of physical drives, within a RAID array upon which data is to be concentrated; moving data stored on said RAID array and/or targeting data written to said RAID array to one or more of said reduced number of physical drives such that said data is concentrated on said reduced number of physical drives in said RAID array; and selectively applying power management logic to enable, based on at least one power management criterion, one or more physical drives in said RAID array to be powered down or to be supplied with reduced power.

By providing such a method, the data geometry within a RAID array can be configured such that one or more of the physical drives forming part of the RAID array can be spun down (or powered down) for, ideally, an extended period using conventional power management approaches. This method provides useful power savings when compared to conventional power logic where all of the physical drives remain powered up unless there is no activity at all on the array.

In one embodiment, data is moved or targeted to one or more of said reduced number of physical drives until each of said reduced number of physical drives reaches a capacity limit.

In one embodiment, the method further comprises, when each of said reduced number of physical drives reaches a capacity limit, targeting data to physical drives other than said reduced number of physical drives.

In one embodiment, the method further comprises monitoring the access frequency of data on the RAID array; and moving more frequently accessed data to said reduced number of physical drives.

In one embodiment, less frequently accessed data is moved to or retained on physical drives other than said reduced number of physical drives.

In one embodiment, data is moved to particular physical drives in dependence upon access frequency such that data having a particular range of access frequencies is located on particular physical drives.

In one embodiment, said steps of monitoring data access frequency and moving data in dependence thereon are carried out as a background process.

In one embodiment, said background process is substantially continuous.

In one embodiment, the method further comprises: monitoring the access frequency of data on the RAID array and moving or targeting data to said reduced number of physical drives in dependence thereon.

In one embodiment, more frequently accessed data is moved to said reduced number of physical drives.

In one embodiment, less frequently accessed data is moved to or retained on physical drives other than said reduced number of physical drives.

In one embodiment, data is moved to particular physical drives in dependence upon access frequency such that data having a particular range of access frequencies is located on particular physical drives.

In one embodiment, said steps of monitoring data access frequency and moving or targeting data in dependence thereon are carried out as a background process.

In one embodiment, said background process is substantially continuous.

In one embodiment, the method further comprises providing a map to identify where data has been moved and/or targeted to on said RAID array.

In one embodiment, said map comprises the original location and/or destination of the data and the new location of the data after said data has been moved and/or targeted.

In one embodiment, the method further comprises defining a plurality of storage segments on each physical drive of said RAID array, each storage segment having a storage index; wherein the step of providing said map comprises storing, for at least one storage segment, the original segment index for where the data was originally located or destined together with the corresponding actual segment index where the data is actually located.

In one embodiment, each storage segment corresponds to a logical block, sector, cluster or other defined data unit.

In one embodiment, the storage resource further comprises a file system for managing data on said RAID array, said map being operable to interface between said file system and said physical drives.

In one embodiment, said map is operable to present said original location and/or destination of the data to said file system irrespective of said actual location of said data.

In one embodiment, said map comprises a look up table.

In one embodiment, said RAID array is controlled by a controller, and said look up table is stored in a memory of said controller and/or in a non-volatile memory.

In one embodiment, said determining comprises a selection performed by a user on a host computer.

In one embodiment, said determining is performed automatically by a controller in response to at least one operational criterion.

In one embodiment, said at least one operational criterion is selected from the group of: storage resource usage; number of data accesses; time of day; overall power consumption of storage resource.

In one embodiment, said power management criterion is the amount of data on each of said physical drives and said step of selectively applying power management logic comprises powering down, or reducing the power supplied to, any physical drives which do not contain data.

In one embodiment, said step of selectively applying power management logic comprises powering down, or reducing the power supplied to, physical drives other than said reduced number.

In one embodiment, said physical drives other than said reduced number remain powered down until data is targeted thereto.

In one embodiment, said power management criterion is activity on said RAID array and said step of selectively applying power management logic comprises powering down, or reducing the power supplied to, any of said physical drives on the RAID array which are inactive for longer than a predetermined period.

According to a second aspect of the present invention, there is provided a controller for power management in a storage resource, the storage resource comprising at least one RAID array including a plurality of physical drives, the controller being operable to: determine a reduced number of physical drives, said reduced number being less that the total number of physical drives, within a RAID array upon which data is to be concentrated; move data stored on said RAID array and/or target data written to said RAID array to one or more of said reduced number of physical drives such that said data is concentrated on said reduced number of physical drives in said RAID array; and selectively applying power management logic to enable, based on at least one power management criterion, one or more physical drives in said RAID array to be powered down or to be supplied with reduced power.

In one embodiment, the controller is further operable to move or target data to one or more of said reduced number of physical drives until each of said reduced number of physical drives reaches a capacity limit.

In one embodiment, the controller is further operable to, once each of said reduced number of physical drives reaches a capacity limit, targeting data to physical drives other than said reduced number of physical drives.

In one embodiment, the controller is further operable to: monitor the access frequency of data on the RAID array; and move more frequently accessed data to said reduced number of physical drives.

In one embodiment, less frequently accessed data is moved to or retained on physical drives other than said reduced number of physical drives.

In one embodiment, the controller is further operable to move data to particular physical drives in dependence upon access frequency such that data having a particular range of access frequencies is located on particular physical drives.

In one embodiment, the controller is operable to monitor data access frequency and move data in dependence thereon as a background process.

In one embodiment, said background process is substantially continuous.

In one embodiment, the controller is operable to monitor the access frequency of data on the RAID array and move or target data to said reduced number of physical drives in dependence thereon.

In one embodiment, the controller is further operable to move more frequently accessed data to said reduced number of physical drives.

In one embodiment, less frequently accessed data is moved to or retained on physical drives other than said reduced number of physical drives.

In one embodiment, data is moved to particular physical drives in dependence upon access frequency such that data having a particular range of access frequencies is located on particular physical drives.

In one embodiment, the controller is operable to carry out said monitoring of data access frequency and moving or targeting data in dependence thereon as a background process.

In one embodiment, said background process is substantially continuous.

In one embodiment, the controller is further operable to provide a map to identify where data has been moved and/or targeted to on said RAID array.

In one embodiment, said map comprises the original location and/or destination of the data and the new location of the data after said data has been moved and/or targeted.

In one embodiment, the controller is further operable to: define a plurality of storage segments on each physical drive of said RAID array, each storage segment having a storage index: wherein provision of said map comprises storing, for at least one storage segment, the original segment index for where the data was originally located or destined together with the corresponding actual segment index where the data is actually located.

In one embodiment, each storage segment corresponds to a logical block, sector, cluster or other defined data unit.

In one embodiment, the controller further comprises a file system for managing data on said RAID array, said map being operable to interface between said file system and said physical drives.

In one embodiment, said map is operable to present said original location and/or destination of the data to said file system irrespective of said actual location of said data.

In one embodiment, said map comprises a look up table.

In one embodiment, said look up table is stored in a memory of said controller and/or in a non-volatile memory.

In one embodiment, said determining is performed by a user on a host computer connected to said controller.

In one embodiment, said determining is performed automatically by the controller in response to at least one operational criterion.

In one embodiment, said at least one operational criterion is selected from the group of storage resource usage; number of data accesses; time of day; overall power consumption of storage resource.

In one embodiment, the controller is implemented in either hardware or software.

In one embodiment, said power management criterion is the amount of data on each of said physical drives and the controller is further operable to apply selectively power management logic by powering down, or reducing the power supplied to, any physical drives which do not contain data.

In one embodiment, the controller is further operable to apply selectively power management logic by powering down, or reducing the power supplied to, physical drives other than said reduced number.

In one embodiment, said physical drives other than said reduced number remain powered down until data is targeted thereto.

In one embodiment, the controller is said power management criterion is activity on said RAID array and the controller is further operable to apply selectively power management logic by powering down, or reducing the power supplied to, any of said physical drives on the RAID array which are inactive for longer than a predetermined period.

According to a third aspect of the present invention, there is provided a computer program product executable by a programmable processing apparatus, comprising one or more software portions for performing the steps of the first to third aspects.

According to a fourth aspect of the present invention, there is provided a computer usable storage medium having a computer program product according to the eighth aspect stored thereon.

Embodiments of the present invention will now be described in detail with reference to the accompanying drawings, in which:

FIG. 4 is a schematic diagram showing a RAID controller and RAID 0 array of an embodiment of the present invention with enhanced power management switched on;

FIG. 7 is a schematic diagram showing a RAID controller and RAID 5 array of an embodiment of the present invention with enhanced power management switched on.

Figure 1:
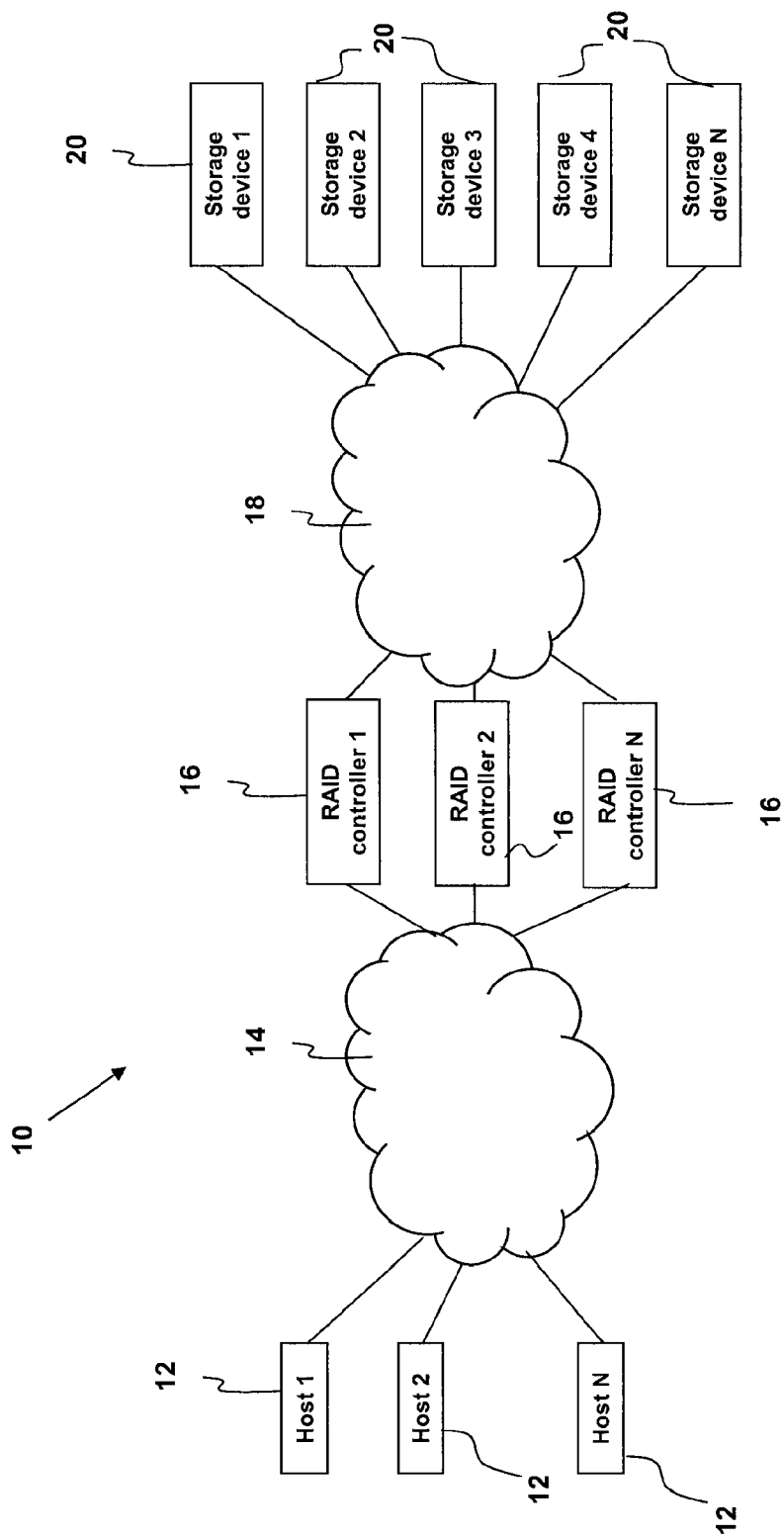
FIG. 1 is a schematic diagram of a networked storage resource.

FIG. 1 shows a schematic illustration of a networked storage resource 10 in which the present invention may be used. The networked storage resource 10 comprises a plurality of hosts 12. The hosts 12 are representative of any computer systems or terminals that are operable to communicate over a network. Any number of hosts 12 may be provided; N hosts 12 are shown in FIG. 1, where N is an integer value.

The hosts 12 are connected to a first communication network 14 which couples the hosts 12 to a plurality of RAID controllers 16. The communication network 14 may take any suitable form, and may comprise any form of electronic network that uses a communication protocol; for example, a local network such as a LAN or Ethernet, or any other suitable network such as a mobile network or the internet.

The RAID controllers 16 are connected through device ports (not shown) to a second communication network 18, which is also connected to a plurality of storage devices 20. The RAID controllers 16 may comprise any storage controller devices that process commands from the hosts 12 and, based on those commands, control the storage devices 20. RAID architecture combines a multiplicity of small, inexpensive disk drives into an array of disk drives that yields performance that can exceed that of a single large drive. This arrangement enables high speed access because different parts of a file can be read from different devices simultaneously, improving access speed and bandwidth.

The operation of the RAID controllers 16 may be set at the Application Programming Interface (API) level. Typically, Original Equipment Manufactures (OEMs) provide RAID networks to end users for network storage. OEMs generally customise a RAID network and tune the network performance through an API.

Any number of RAID controllers 16 may be provided, and N RAID controllers 16 (where N is an integer) are shown in FIG. 1. Any number of storage devices 20 may be provided; in FIG. 1, N storage devices 20 are shown, where N is any integer value.

The second communication network 18 may comprise any suitable type of storage controller network which is able to connect the RAID controllers 16 to the storage devices 20. The second communication network 18 may take the form of, for example, a SCSI network, an iSCSI network or fibre channel.

The storage devices 20 may take any suitable form; for example, tape drives, disk drives, non-volatile memory, or solid state devices. Although most RAID architectures use hard disk drives as the main storage devices, it will be clear to the person skilled in the art that the embodiments described herein apply to any type of suitable storage device. More than one drive may form a storage device 20; for example, a RAID array of drives may form a single storage device 20. The skilled person will be readily aware that the above features of the present embodiment could be implemented in a variety of suitable configurations and arrangements.

The RAID controllers 16 and storage devices 20 also provide data redundancy. The RAID controllers 16 provide data integrity through a built-in redundancy. The RAID controllers 16 are arranged such that, should one of the drives in a group forming a RAID array fail or become corrupted, the missing data can be recreated from the data on the other drives. The data may be reconstructed through the use of data mirroring or parity. In the case of a disk rebuild operation, this data is written to a new replacement drive that is designated by the respective RAID controller 16.

Figure 2:
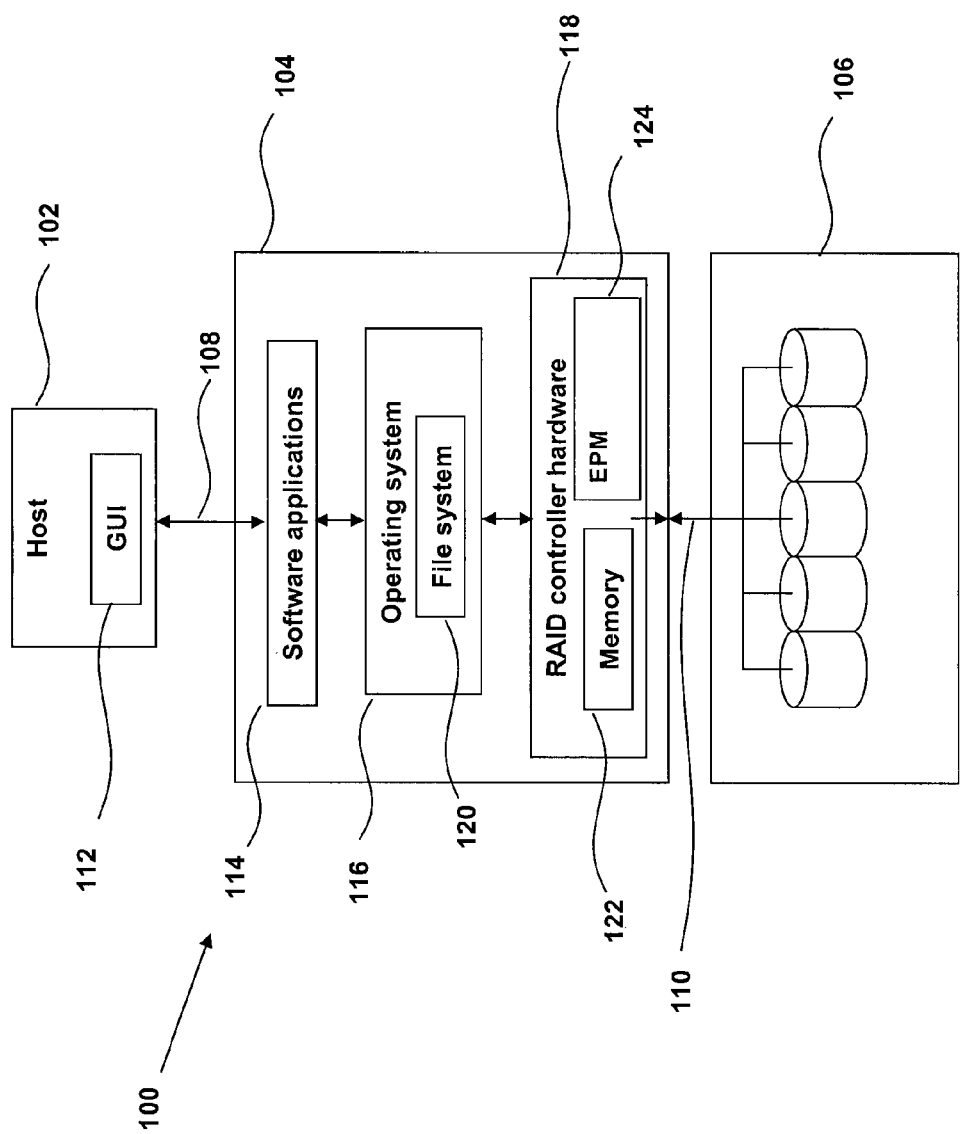
FIG. 2 is a schematic diagram showing a RAID controller of an embodiment of the present invention.

FIG. 2 shows a schematic diagram of an arrangement in which the present invention may be used. A storage resource 100 comprises a host 102, a RAID controller 104, and a storage device in the form of a RAID array 106. The host 102 is connected to the RAID controller 104 through a communication network 108 such as an Ethernet and the RAID controller 104 is, in turn, connected to the RAID array 106 via a storage network 110 such as an iSCSI network.

The host 102 comprises a general purpose computer (PC) which is operated by a user and which has access to the storage resource 100. Any number of hosts 102 may be provided. However, for clarity, only one host 102 is shown in FIG. 2. A graphical user interface (GUI) 112 is run on the host 102. The GUI 112 is a software application used to input attributes for the RAID controller 104, and acts as a user interface for a user of the host 102.

The RAID controller 104 comprises a software application layer 114, an operating system 116 and RAID controller hardware 118. The software application layer 114 comprises software applications including the algorithms and logic necessary for the initialization and run-time operation of the RAID controller 104. The software application layer 114 includes software functions such as a system manager for fault management and task scheduling. The software application layer 114 also receives requests from the host 102 (e.g., assigning new volumes, read/write requests) and executes those requests. Requests that cannot be processed (because of lack of space available, for example) are returned as error messages to the user of the host 102.

The operating system (OS) 116 utilises an industry-standard software platform such as, for example, Linux, upon which the software applications forming part of the software application layer 114 can run. The operating system 116 comprises a file system 120 which enables RAID controller 104 to store and transfer files.

The RAID controller hardware 118 is the physical processor platform of the RAID controller 104 that executes the software applications in the software application layer 114. The RAID controller hardware 118 comprises a microprocessor, memory 122, and all other electronic devices necessary for RAID control of the RAID array 106.

The RAID controller hardware 118 also comprises the firmware or software for an enhanced power manager (EPM) 124 on the RAID array 106. The EPM 124 is configured to reduce power consumption of the RAID array 106 as will be described later.

Figure 3:
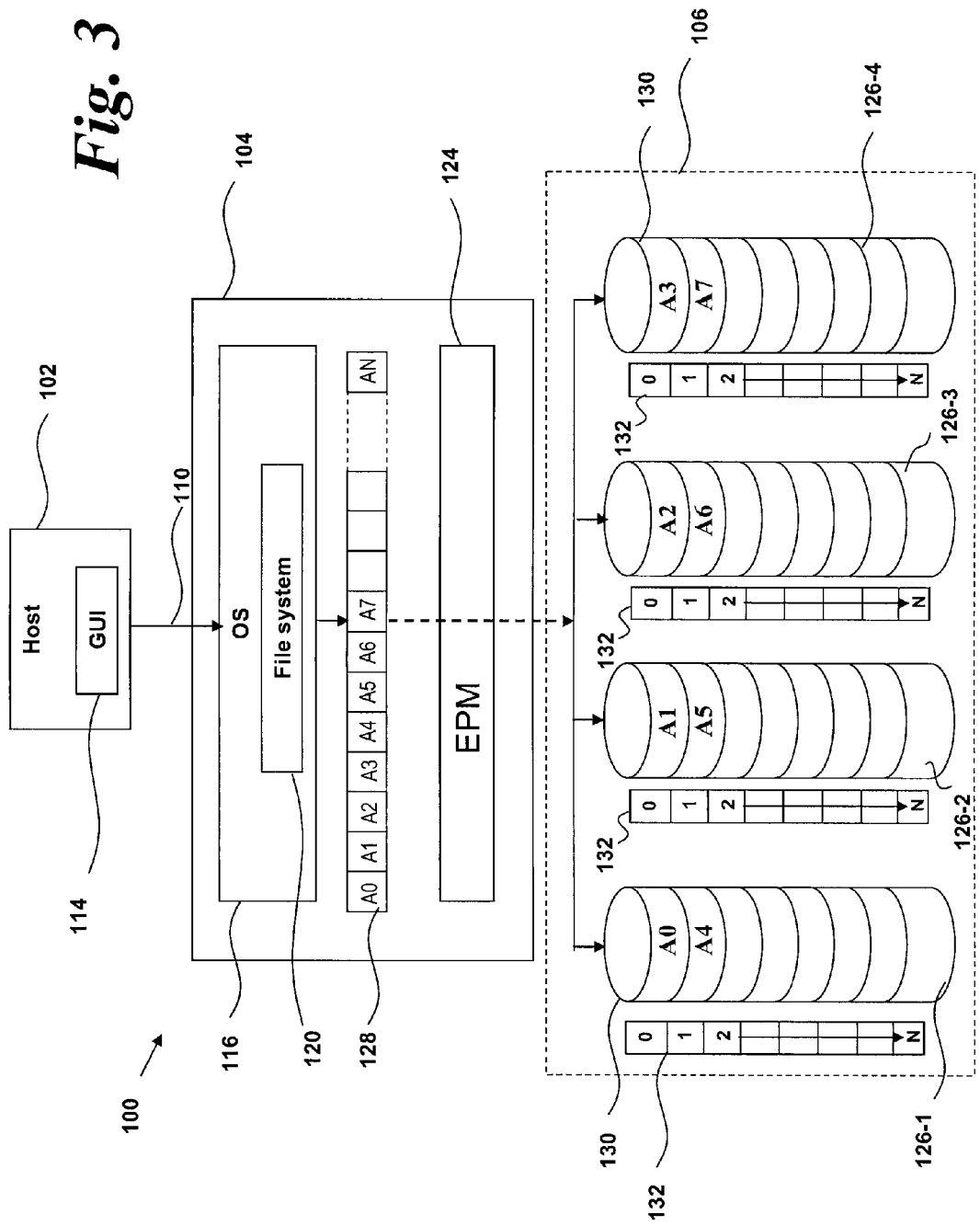
FIG. 3 is a schematic diagram showing a RAID controller and RAID 0 array of an embodiment of the present invention with enhanced power management switched off.

FIG. 3 shows a schematic diagram of the main components of the RAID controller 104 and RAID array 106 in the context of the present invention. In this example, the RAID array 106 comprises four physical drives 126 (labelled 126-1 to 126-4) arranged in a RAID 0 configuration. In this embodiment, each physical drive 126 comprises a hard disk drive of large capacity, for example, 1 TB. However, the physical drives may take any suitable form of storage device, such as, for example, tape drives, disk drives, non-volatile memory, or solid state devices. Although most RAID architectures use hard disk drives as the main storage devices, it will be clear to the person skilled in the art that the embodiments described herein apply to any type of suitable storage device.

Each physical drive 126 forms part of a RAID 0 array and the data stored thereon is stored in the form of data "stripes" in which the data to be stored is broken down into blocks called "stripe units". The "stripe units" are then distributed across the physical drives 126. This is shown in FIG. 3 where stripe units A0 to A7 are illustrated as being stored across each of the four physical drives 126.

The RAID 0 array of physical drives 126 is, via the RAID controller 104, presented to the host 102 as a logical drive 128. This is shown schematically in FIG. 3. However, any number of logical drives 128 may be provided. Upon the logical drive 128 may be defined one or more volumes which can be read/write accessed by the host 102. The logical drive 128 may each be considered to be a usable region of storage capacity located on one or more of the physical disk drive components 126 forming the RAID array and includes the data stripes A0 to AN (and includes the stripes A0 to A7 as shown stored on the physical drives 126).

The logical drive 128 can be accessed by the host 102 and RAID controller 104 to read/write data. Input/output processing can also be carried out on the logical drive 128 in the manner of an actual physical drive; for example, defragmentation, rebuilding or backup operations. Therefore, the host 102 does not have visibility of the actual physical arrangement of data across the physical drives 126—this is handled by the OS 116 and file system 120.

FIG. 3 illustrates a situation where the EPM 124 is switched off or is not operational. Therefore, effectively, FIG. 3 shows a standard RAID 0 array. Each physical drive 126-1, 126-2, 126-3, 126-4 comprises a number of sectors or segments 130. Each segment 130 comprises a block of data storage on the respective physical drive 126. In this embodiment, each segment 130 corresponds to a logical block.

Commonly, the physical drives 126 are formatted such that each segment 130 comprises 512 bytes (4096 bits). The term "segment" used herein, whilst described in an embodiment with particular reference to 512 byte logical block sizes, is generally applicable to any sector or segment size. Therefore, the term "segment" is merely intended to indicate a portion of the storage availability on a physical drive and is not intended to be limited to any of the disclosed examples. The optimal choice is dependent upon the file system, the data base and/or the type of accesses involved.

Each segment 130 on each physical drive 126 has an address. Where each segment 130 corresponds to a logical block, this is known as a logical block address (LBA). As shown schematically in FIG. 3, each segment 130 has a file system segment index 132 identifying the address of that particular segment to the file system 120. The term "file system segment index" is used because this is the address of the data as it appears to the file system (irrespective of the actual address of the data on the RAID array 106) as will be described later. The file system segment index comprises both the target physical drive reference (i.e. the drive 126 upon which the data is stored) and the segment index within that drive 126.

As shown in FIG. 3, data is striped across each of the physical drives 126-1, 126-2, 126-3, 126-4 in the form of stripe units A0-A7. Therefore, when a data file which (for the purposes of this illustration) comprises stripe units A0-A3, all of the physical drives 126-1, 126-2, 126-3, 126-4 are required to spin up. Therefore, applying conventional power management logic to this configuration will result in little or no power savings unless there is no activity at all on the RAID array. Since this is likely to be a rare situation, relatively little benefit can be had from conventional power management implementations in this data storage configuration.

Figure 4:
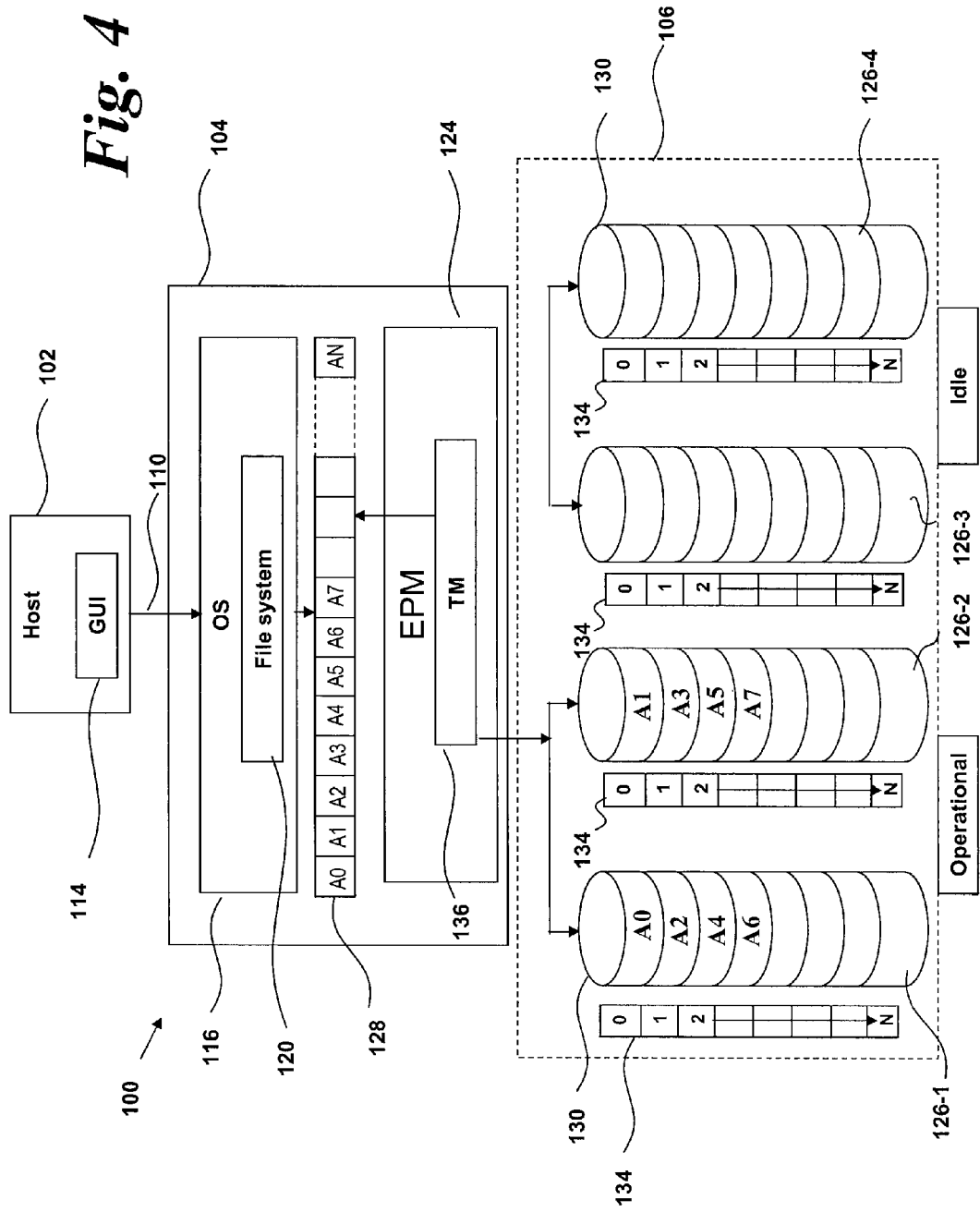

FIG. 4 shows the arrangement of FIG. 3 but, in this case, the EPM 124 is switched on. The EPM 124 analyses the geometry of data stored on the physical drives 126, and is configured to move and group data such that the data is concentrated on a desired number of physical drives 126, enabling at least some of the physical drives 126 to be powered down and remain idle using conventional power management techniques.

Therefore, as shown in FIG. 4, by moving data (in the form of stripe units A0-A7) from all four physical drives 126-1, 126-2, 126-3, 126-4 to reside on just two of the physical drives 126-1, 126-2, the remaining two physical drives 126-3, 126-4 can be powered down and remain idle. This provides a 50% reduction in power consumption (not taking into account the power of the physical drives 126-3, 126-4 which require a relatively small amount of power to idle).

Once the EPM 124 has remapped the data on the physical drives 126, the data now resides at a new address. In other words, each segment of the moved data now resides at a second, actual segment index 134. Consequently, if the OS 116 or file system 120 were to attempt to access the data at the old location (i.e. at the original file system segment index 130), an error would be generated because the data is no longer present at that location. Consequently, a transfer map 136 is provided as part of the EPM 124. The transfer map 136 presents to the OS 116 a consistent image of the location of data across the physical drives 126 irrespective of the actual location of data on the physical drives 126.

As shown in FIG. 4, the EPM 124 comprises the transfer map 136. The transfer map 136 comprises a map of the data which has been moved following the geometry analysis by the EPM 124. The transfer map 136 provides a correlation between the file system segment index 132 (as shown in FIG. 3) of each segment 130 containing data prior to operation of the EPM 124, and the actual segment index 134 (as shown in FIG. 4) of the data once moved by the EPM 124.

In other words, the transfer map 136 can be used to provide a translation map between the original location of the data and the new, power management optimised, location of the data. This enables the data contained on the physical drives 126 to be accessed by the file system 120 and OS 116 without a priori knowledge of the new location of the data.

Figure 5:
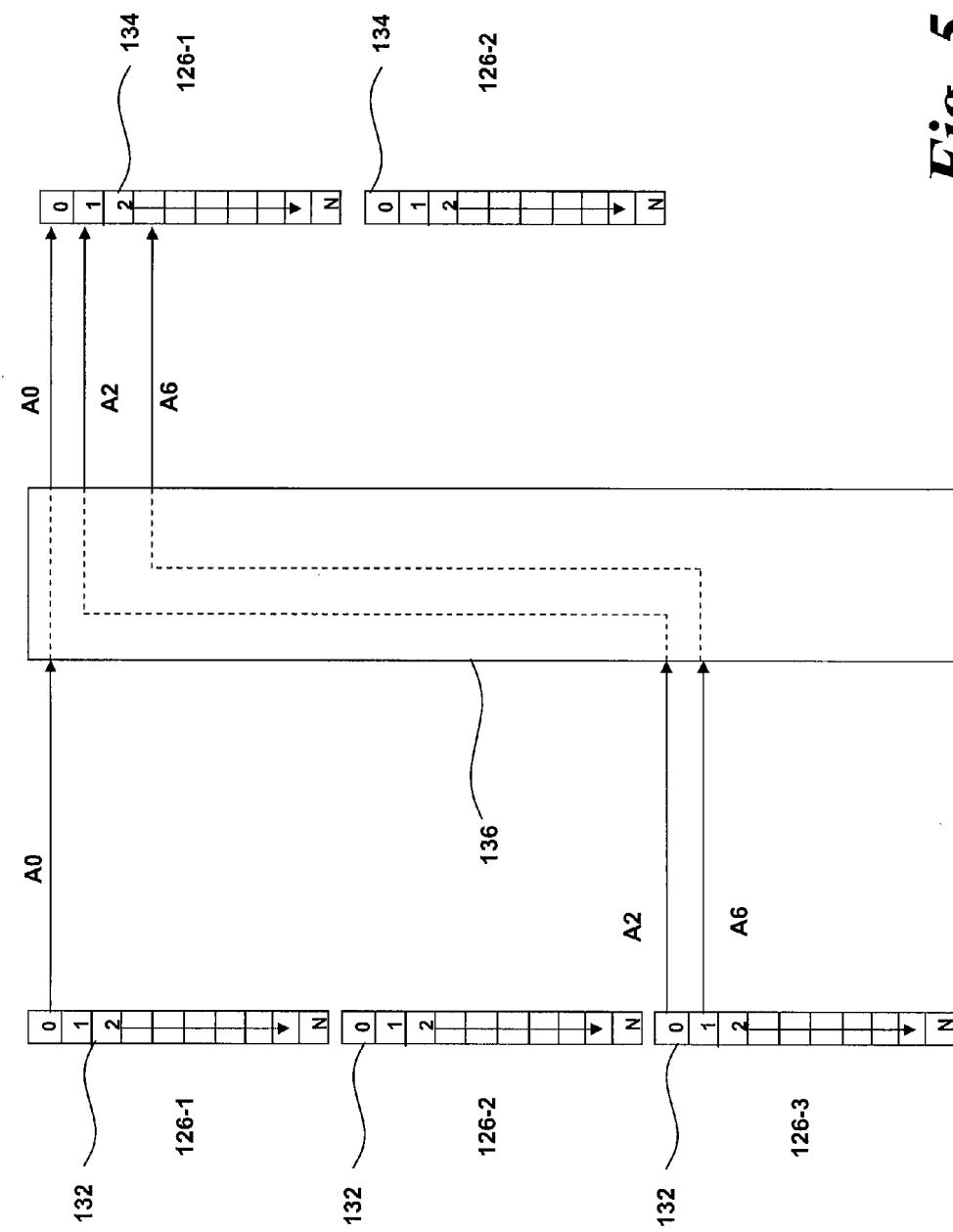
FIG. 5 is a schematic diagram of the mapping between storage sector indices in an embodiment of the present invention.

A schematic diagram of the transfer map 136 is shown in FIG. 5. In FIG. 5, the transfer map 136 is illustrated with reference to stripe units A0, A2 and A6 as shown in FIGS. 3 and 4. Stripe unit A0 was initially located on physical drive 126-1 at file system segment index 0 and remains in this location after optimisation of the drives 126 by the EPM 124. Therefore, the transfer map 136 for the data at segment index 0 on drive 126-1 has direct correspondence between the pre-and post-optimisation locations of stripe unit A0.

However, for data stripe units A2 and A6, their locations differ before and after the EPM optimisation process. For stripe unit A2 which was initially stored on drive 126-3 in file system segment index 0, this data is now stored on drive 126-1 in actual segment index 1. Similarly for data stripe unit A6, this data was initially stored on drive 126-3 in file system segment index 1 and has been moved to drive 126-1 in actual segment index 3. Therefore, the transfer map 136 provides direct correlation between the original data location and the new data location. Consequently, a consistent view is presented to the OS 116 and file system 120, irrespective of the data's actual location with the RAID 0 array when reading and writing data.

In use, new data will be written to the RAID array 106. Whilst the OS 116 and file system 120 will attempt to write the data to the drive in standard RAID 0 format, the EPM 124 will direct data to appropriate locations to achieve the desired power savings. For example, the EPM 124 will direct data to fill up the operational drives 126-1 and 126-2 first rather than distribute data across each of the physical drives 126 as shown in FIG. 3.

In this case, the file system segment index 132 will correspond to the target destination for the write, whereas the actual segment index 134 will be where the data is directed to by the EPM 124 and is actually stored. The file system segment index 132 will then be stored with the actual segment index 134 in the transfer map 136 such that the data locations on the RAID array appear to the file system 120 as the file system segment indices 130.

As described above, any data already existing on the RAID 0 array is moved to enable data to be stored on fewer physical drives 126. In addition, newly-written data is directed towards the physical drives 126 in use such that a number of drives 126 in the array can remain powered down.

However, after a period of time, the amount of data written to the array might be greater than the amount of storage space available on (to use the example of this embodiment) the powered-up physical drives 126-1 and 126-2. In this case, the remaining drives 126-3 and 126-4 will have to be used, reducing the power savings achievable.

However, there are still steps that can be taken to reduce power consumption. For example, the EPM 124 can maintain a log of the access frequency of data on the RAID array. This log could, in one implementation, be incorporated into the transfer map 136. The EPM 124 could then move data around on the RAID array (a process known as "background grooming") to ensure that the most frequently accessed data is co-located on a single, or reduced number, of physical drives 126.

For example, consider the situation where the EPM 124 locates the most frequently accessed data on physical drives 126-1 and 126-2. Therefore, even though physical drives 126-3 and 126-4 may contain data, this data is infrequently accessed and so conventional power management logic can be applied to these drives with useful power savings. Consequently, physical drives 126-3 and 126-4 can be maintained in a powered-down state for longer than would be achievable in a conventional RAID array where data is distributed across all of the drives in the array, irrespective of access frequency.

As the EPM 124 moves data on the physical drives 126, the transfer map 136 is updated to reflect the new actual segment index 134 which indicates where the data is actually stored.

Therefore, through use of the EPM 124, data can be reorganized intelligently to enable more effective (and possibly multi-layer) power management logic to be applied to a RAID array such that beneficial reductions in power consumption can be obtained.

For example, in a situation where some of the physical drives 126 in the RAID 0 array are empty after reorganization of the data on the RAID array as discussed above, then the EPM 124 can explicitly power those physical drives 126 down immediately. Those physical drives 126 can then be maintained in a powered down, or reduced power, state until such time as data is actually targeted to those particular physical drives 126.

In addition or in the alternative, standard power management logic can also be applied to the RAID array. For example, any windows of inactivity for any of the physical drives 126 on the RAID array can be identified and the relevant physical drives 126 powered down. This may include the physical drives to which data has been concentrated, the physical drives which have been left empty or containing less frequently accessed data, or both. The method and apparatus of the present invention, essentially, enables standard power management approaches based on inactivity to be more effective.

Consequently, the combination of the intelligent reorganization of the data by the EPM 124, together with the application of explicit and standard power management approaches enables a newly improved level of power savings to be achieved within a RAID array.

Figure 6:
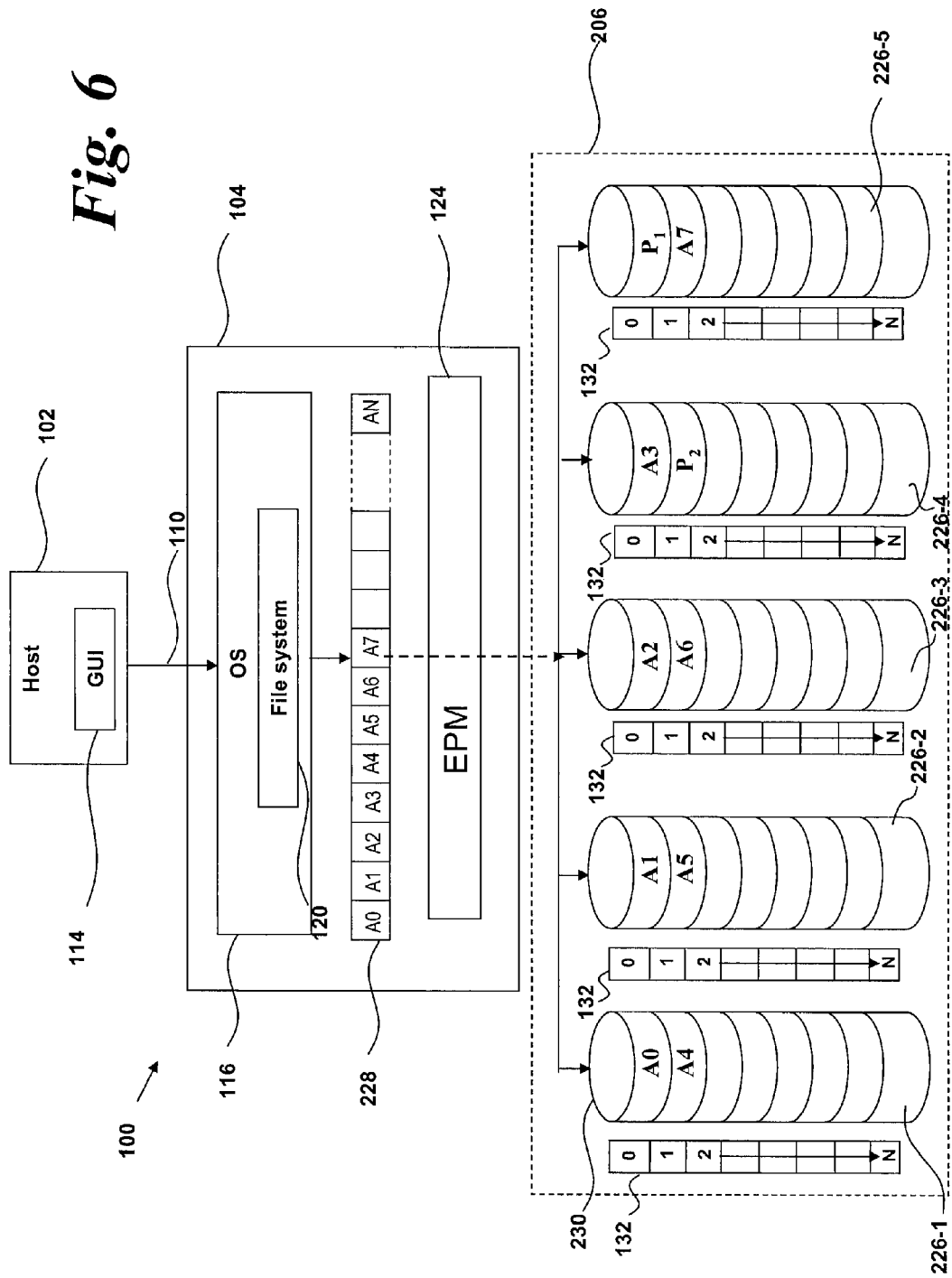
FIG. 6 is a schematic diagram showing a RAID controller and RAID 5 array of an embodiment of the present invention with enhanced power management switched off.
Figure 7:
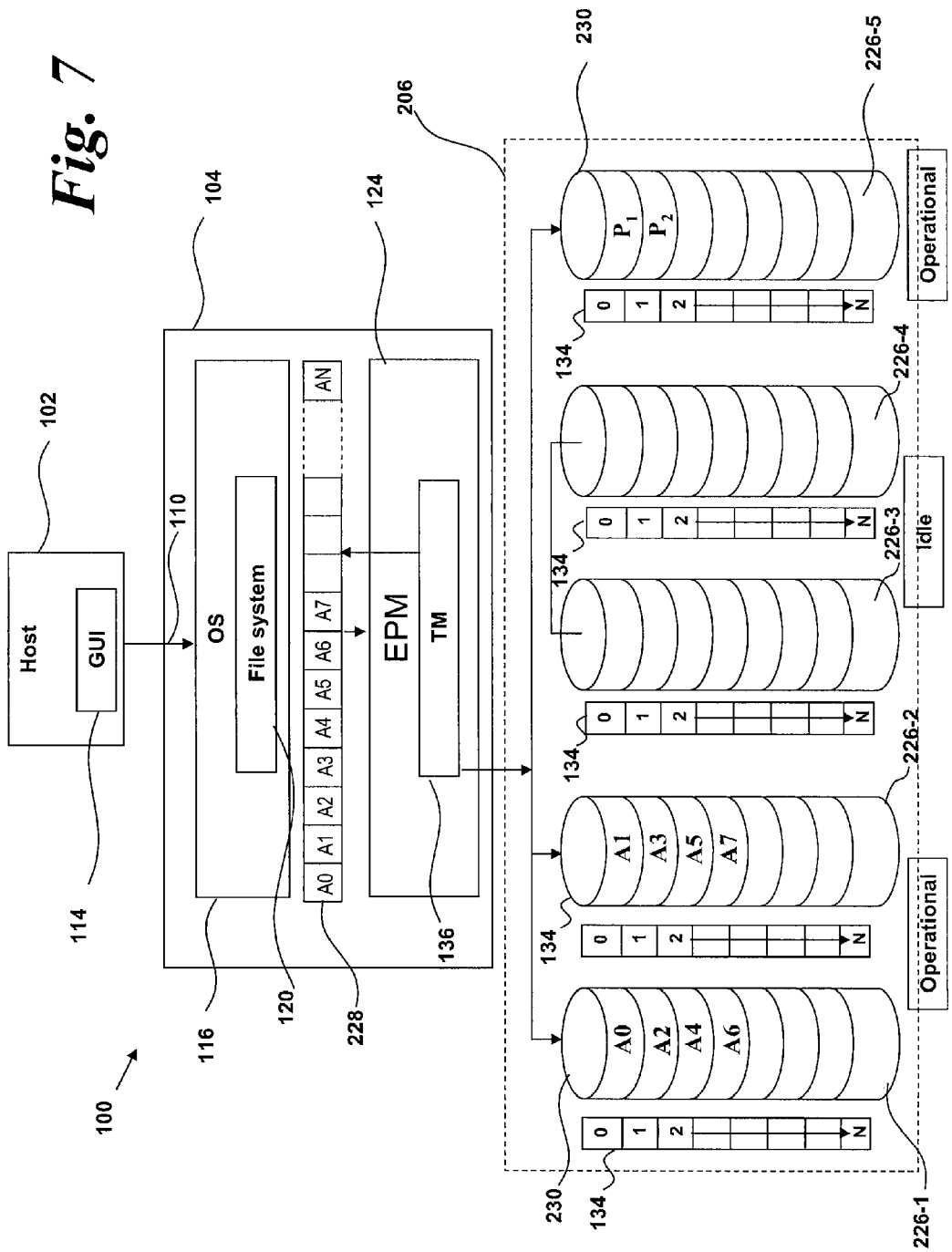

Another example of enhanced power management is illustrated with respect to FIGS. 6 and 7. FIGS. 6 and 7 illustrate the application of the EPM principle to a RAID 5 array. In this embodiment, the storage device 206 comprises five physical drives 226-1 to 226-5.

The RAID 5 array of physical drives 226 is, via the RAID controller 104, presented to the host 102 as a plurality of logical drives 228 as described previously with reference to FIGS. 3 and 4. Any number of logical drives 228 may be provided and, in this embodiment, N logical drives are shown schematically. Upon each logical drive 228 may be defined one or more volumes which can be read/write accessed by the host 102. The logical drives 228 may each be considered to be a usable region of storage capacity located on one or more of the physical disk drive components 226 forming the RAID 5 array.

In common with FIG. 3 of the previous embodiment, FIG. 6 illustrates a situation where the EPM 124 is switched off or is not operational. Therefore, effectively, FIG. 6 shows a standard RAID 5 array. Each physical drive 226-1, 226-2, 226-3, 226-4, 226-5 comprises a number of sectors or segments 230. Each segment 230 comprises a block of data storage on the respective physical drive 226.

As shown in FIG. 6, data is striped across each of the physical drives 226-1, 226-2, 226-3, 226-4, 226-5 in the form of stripe units A0-A7. Additionally, parity data stripe units $P_1$ and $P_2$ are provided for data redundancy. Again, applying conventional power management logic to this configuration will result in little or no power savings unless there is no activity at all on the RAID array. Since this is likely to be a rare situation, relatively little benefit can be had from conventional power management implementations in this data storage configuration.

FIG. 7 shows the arrangement of FIG. 6 but, in this case, the EPM 124 is switched on. The EPM 124 analyses the geometry of data stored on the physical drives 226, and is configured to move and group data such that the data is concentrated on a desired number of physical drives 226, enabling at least some of the physical drives 226 to be powered down and remain idle.

Therefore, as shown in FIG. 7, by moving data (in the form of stripe units A0-A7 and parity data stripe units $P_1$ and $P_2$) from all five physical drives 226-1, 226-2, 226-3, 226-4, 226-5 to reside on just three of the physical drives 226-1, 226-2 (for stripe unit data) and 226-5 (for parity data), two physical drives 226-3, 226-4 can be powered down and remain idle. This provides a 40% reduction in power consumption (not taking into account the power consumption of the physical drives 226-3, 226-4 which require a relatively small amount of power to idle). Further, as an artifact of movement of data onto fewer drives, the RAID 5 array under EPM effectively becomes a RAID 4 array.

Whilst the above examples have been described illustrated with reference to RAID 0 and RAID 5 arrays, the present invention is applicable to other RAID configurations. The skilled person would be readily aware of alternative systems or arrays that could be used with the present invention. Further, the present invention is applicable to storage systems comprising multiple arrays. Clearly, the power savings achieved with the present invention are increased when applied to larger networks of physical drives.

As shown in the above embodiments, the present invention enables data to be stored on a RAID array in locations that would specifically allow for a particular number of drives to remain un-accessed and therefore able to spin down for extended time periods. Within storage arrays, physical drives are responsible for the vast majority of power consumption, and those storage arrays are responsible for the bulk of the power consumption within typical data centres.

Therefore, by utilising the approach of the present invention, a meaningful percentage of drives can remain spun down, providing large benefits to the overall IT management community.

Additionally, most storage arrays are configured by administrators to maintain a non-trivial percentage of minimum free space. This further benefits the present invention because drives selected to remain powered up can be filled to a capacity greater than that normally set by system administrators, making more efficient use of the storage space available.

The above approaches illustrate situations where, for clarity, a conventional RAID array with data stored thereon, is optimised by activation of the EPM process 124. However, it is to be appreciated that the EPM 124 could be run permanently from switch-on of a new RAID array.

Additionally, the EPM 124 will operate in the background on an array and continually migrate data based on access frequency such that only a proportion of the physical drives in a RAID array contain the most frequently accessed data. In other words, the most frequently accessed data is grouped on particular physical drives, thereby enabling other physical drives to be powered down for extended periods.

An example of this in use is a situation where previously frequently accessed data is deleted. In this case, the EPM 124 will note that a portion of a physical drive is accessed less frequently than other portions thereof. Consequently, the EPM 124 logic in the RAID controller 104 would eventually detect low-activity areas on the drives and migrate data accordingly to ensure that frequently accessed data is grouped together.

Additionally, as part of the EPM 124 there could also exist file system mapping logic at the host 102 level (either embedded in the OS or off-host) to instruct the controller when file data has been deleted so the corresponding areas on the drives could be proactively cleared from the EPM maps in the controller.

An important advantage of the above-described arrangements is that complex power management schemes are not required with the EPM 124 operating. In contrast, conventional power management approaches will now be effective on a RAID array. For example, simply applying a common timer-based power management scheme (fixed or dynamically variable) to the physical drives affiliated with each chunk/sub-stripe grouping would yield significant benefits.

However, in practice, the operation of the EPM 124 will reduce the number of physical drives 126; 226 in normal use on the RAID array forming part of the storage resource 100. Consequently, because fewer physical drives 126; 226 are available, access/write time for data may be increased because the data transfer must be completed across fewer drives. Additionally, latency may be affected. This is simply an unavoidable consequence of utilising fewer drives in normal operation. Additionally, the use of fewer drives to store a given amount of data may lead to reduced reliability in the form of shorter mean time between failures (MTBFs).

However, the above effects can be mitigated by selecting the degree of operation of the EPM 124. For example, the level of power management could be selected by a user, or selected automatically by the RAID controller 104 based on knowledge of the user demand on the RAID array.

The level of power management will determine the involvement of the EPM 124 in reorganizing the data on a RAID array. The level could be specified in a number of ways; for example, the user could utilise a slider bar to set a percentage of power saving vs performance/reliability. Alternatively, the user could specify a percentage or number of drives to be powered down in normal use.

Taking the example of FIGS. 3 and 4, a user could specify a particular maximum number or maximum proportion of physical drives which are to be powered down. In this case, say, for example, only one drive could ever be powered down to preserve access/write speed to the RAID array, only drive 126-4 could be powered down and the EPM 124 would distribute data across drives 126-1, 126-2 and 126-3 with only infrequently accessed data being stored on the physical drive 126-4 if drives 126-1, 126-2 and 126-3 do not collective comprise sufficient capacity for all the data on the array.

In the alternative, if maximum power savings are required, the EPM 124 may power down drives 126-2, 126-3 and 126-4 whilst maintaining drive 126-1 in a powered-on state.

Of course, the amount of data, and the access frequency of that data, will impose limits on the power savings achievable. If three of the four drives contain frequently accessed data, the EPM 124 will not be able to power down more than one drive for extended periods. However, even in this case, significant power savings can be obtained over conventional power management schemes.

Figure 8:
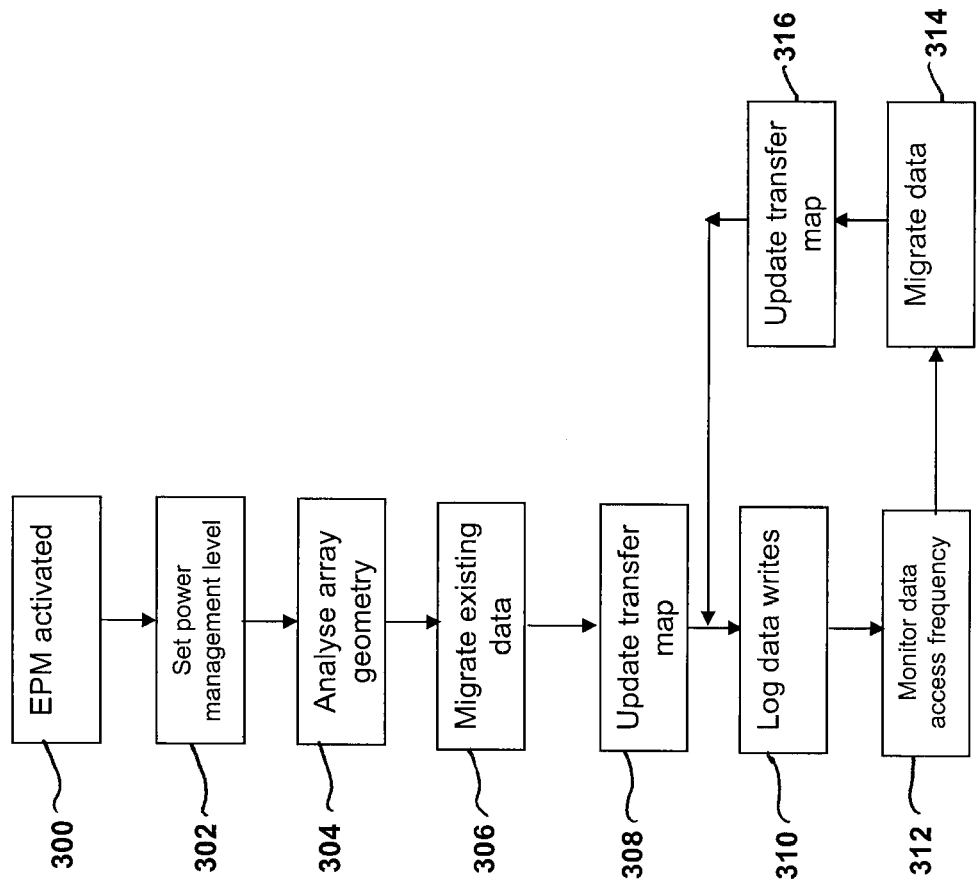
FIG. 8 is a flow diagram illustrating the process of reading data from a secondary storage device.

The operation of the network storage resource 100 will now be described with reference to FIG. 8. FIG. 8 shows a flow diagram of the method of operation of the EPM 124.

Step 300: EPM Activated

At step 300, the EPM 124 is activated. This may be done on-host by a user, or may be done on- or off-host automatically by the RAID controller 104 in response to a particular criteria. The EPM 124 may be activated at initialization of a storage resource 100, or when the storage area network is operational 100. In other words, the EPM 124 is operable whether data exists on the RAID array or not.

The method now proceeds to step 302.

Step 302: Set Power Management Level

The power management level sets the degree of control that the EPM 124 has over the reorganization of data on the RAID array. The power management level enables a user to select a level of power management on a scale from maximum power efficiency up to maximum reliability/performance. This may, for example, take the form of a slider bar which the user sets at a desired level.

Alternatively, the user may request that the data on the RAID array be organised such that the a particular number of drives in the array are to be spun down in normal use—e.g. 2 drives out of 4, or 5 drives out of 10. Instead of a number, the user could also specify a proportion of drives—for example, as a percentage. This would be automatically calculated in view of the number of drives and the desired proportion to be spun down.

As a further alternative, the power management level could be set automatically by the RAID controller 104, on- or off-host software or firmware, or by the file system. This may enable the system to be adaptive in use by, for example, increasing performance of the system in periods of particularly high use on the storage resource 100 (where access time may be a critical factor) whilst increasing power efficiency during times of lower activity (when access time is of less concern).

There may be situations where, due to the nature of data on the array, a particular power management level may not be available. In this situation, options may be presented as unavailable to the user, or the EPM 124 may simply get as close as possible to the desired power management level given the array configuration.

The method then proceeds to step 304.

Step 304: Analyse Array Geometry

The EPM 124, as part of the RAID controller 104, then analyses the arrangement of data on the RAID array. The EPM 124 is operable to analyse the number of drives in the array, the data (if any) stored thereon and the location of that data on the drives. At this stage, the transfer map 136 is generated and can be updated with details of the file system segment index for each of the data segments or blocks on the RAID array.

Once the array geometry has been analysed, in view of the specified power management level, any existing data on the array can be migrated in step 306. If there is no data to migrate on the array (i.e. if the array is empty), then the method proceeds directly to step 310.

Step 306: Migrate Existing Data.

At step 306, if it has been determined in step 304 that data is present on the RAID array, the EPM 124 is operable to migrate that data to reduce the number of drives that the data is spread across. At this stage, information relating to access frequency is unavailable. Therefore, the EPM 124 migrates data to locate the data on fewer drives than the total number of drives in the array as specified in accordance with the power management level set in step 302, enabling unused drives to be powered down.

The method then proceeds to step 308.

Step 308: Update Transfer Map

At step 308, the transfer map 136 is updated to reflect the data migrations that have happened in step 306. The transfer map 136 now maintains the file system segment index 132 (i.e. the original configuration of data, or layout of data segments, on the array) and the actual segment index 134 (i.e. where the data is now located after migration).

The method then proceeds to step 310.

Step 310: Log Data Writes

At step 310, the EPM 124 monitors writes to the RAID array from the host 102 or other accessing hosts. When a write request to a particular address is received, this is logged as the file system segment index 132 in the transfer map and the data is written to a selected location on the array in dependence upon the power management level and EPM logic. The actual location of the written data will then be stored in the transfer map 136 as the actual segment index 134 of that data.

The method then proceeds to step 312.

Step 312: Monitor Data Access Frequency

At step 312, the EPM 124 monitors the access frequency of data on the RAID array. This is performed continuously as a background whilst the EPM 124 is active. The access frequency may be stored in the transfer map 136, or alternatively may be stored as a separate look up table (LUT).

Step 314: Migrate Data

Based upon the access frequency of the data on the drives of the RAID array, the EPM 124 can co-located most frequently accessed data on one or more drives. This is done as a continuous background monitoring process. Therefore, if any data is deleted from one of the drives containing frequently accessed data, the space left will be filled with other frequently accessed data from another drive in the array.

Step 316: Update Transfer Map

Based on the migration of data in step 314, the transfer map 136 is updated to reflect the new location of the moved data.

The method then proceeds back to step 310 whilst the EPM 124 is active. However, the loop is broken when the EPM 124 is disabled; for example, by a user.

Once the EPM 124 is active, or has been run on the RAID array, data is reorganized intelligently to enable more effective (and possibly multi-layer) power management logic to be applied to a RAID array such that beneficial reductions in power consumption can be obtained.

Therefore, the EPM 124 may power down any physical drives 126; 226 in the RAID array which are empty after reorganization of the data on the RAID array as discussed above. These physical drives 126; 226 can then be maintained in a powered down, or reduced power, state until such time as data is actually targeted to those particular physical drives 126; 226.

In addition or in the alternative, standard power management logic can then be applied to the RAID array. For example, any windows of inactivity for any of the physical drives 126 on the RAID array can be identified and the relevant physical drives 126 powered down. This may include the physical drives to which data has been concentrated, the physical drives which have been left empty or containing less frequently accessed data, or both. The method of the present invention, essentially, enables standard power management approaches based on inactivity to be more effective.

Consequently, the combination of the intelligent reorganization of the data by the EPM 124, together with the application of explicit and standard power management approaches enables a newly improved level of power savings to be achieved within a RAID array.

The EPM 124 and associated transfer map 136 can be used in other RAID operations. For example, an essential feature of a RAID array file system (with a RAID level above 0) is that of a rebuild operation. If, for example, the one of the physical drives should become corrupted or fail, or if one or more of the drives is replaced to increase capacity or speed, then a rebuild operation will be required.

In this case, the newly swapped-in drive can be rebuilt using the data stored on the other drives and by querying the transfer map 136 to locate the data appropriately on the remaining devices.

In normal use, the EPM implementation described above will be effectively invisible to the file system 120, operating system 116 and host 102. This means that the host 102 will be presented with a view of the RAID array which is preferably similar to that of a standard RAID array, with the operation of the EPM being hidden to the host 102. However, there may be circumstances in which the EPM file structure and interface could be exposed to the host 102.

One of these circumstances may arise when, a backup is required. In this case, an interface to the data store and management infrastructure could be exposed for backup purposes.

The interface to the EPM configuration may be exposed through a proprietary Application Programming Interface (API) or through a conventional file system on one of the drives of the RAID array (where the data store and affiliated management infrastructure is encapsulated inside one or more files). This approach may yield significant benefits in terms of backup performance when compared to conventional host-based file system approaches.

In a conventional, host-based file system, a significant portion of the time expended in backing up a storage device or logical volume is spent analysing the data. Commonly, every file is required to be touched or opened during the backup process. Even in cases where traditional image backup methods are used typically utilise a pre-analysis of the data or require the entire drive or volume to be processed (including unused free space on the drive or volume).

In contrast, in the EPM approach, the data has been already analysed and stored relative to particular protocols. Therefore, a backup operation could simply backup these file streams with speeds matching image backups, but without any additional processing overhead.

Additionally, whilst the embodiments of the present invention described above operate predominantly in off-host firmware or software (e.g. on the RAID controller 104), an on-host arrangement could be used. In this arrangement, the whole of the EPM operation is carried out in on-host software input/output (I/O) subsystems.

Variations of the above embodiments will be apparent to the skilled person. The precise configuration of hardware and software components may differ and still fall within the scope of the present invention.

For example, the transfer map may provide translation between primary data storage locations and secondary data storage locations in other manners; for example, logical block addresses, cylinder head sectors or a different file mapping arrangement.

Embodiments of the present invention have been described with particular reference to the examples illustrated. While specific examples are shown in the drawings and are herein described in detail, it should be understood, however, that the drawings and detailed description are not intended to limit the invention to the particular form disclosed. It will be appreciated that variations and modifications may be made to the examples described within the scope of the present invention.

The invention claimed is:

1. A method comprising:
   storing a first data set in a RAID array having a total number N storage devices so that a different portion of the first data set is stored in each of the N storage devices, the first data set comprising a RAID data set consisting of a first number of user data stripe units and a second number of parity data stripe units configured to reconstruct user data in the user data stripe units responsive to a failure of a selected one of the N storage devices;
   determining a reduced number M storage devices of the N storage devices within the RAID array upon which data is to be concentrated where M<N;
   migrating selected portions of the first data set to the M storage devices so that the data set is stored across a fewer number M of storage devices and the remaining N−M storage devices of the RAID array do not store any portion of the data set;
   subsequently transitioning the remaining N−M storage devices to a reduced power mode;
   storing a second data set to the RAID array by storing a different portion of the second data set to each of the M storage devices while maintaining the remaining N−M storage devices in a reduced power mode;
   monitoring a total amount of data stored on at least one of the M storage devices;
   transitioning at least one of the remaining N−M storage devices to a fully operational mode responsive to the monitored total amount of data reaching a selected threshold; and
   storing at least a portion of a third data set on the at least one of the remaining N−M storage devices transitioned to the fully operational mode.

2. The method of claim 1, wherein each of the first, second and third data sets comprises user data and parity information configured to facilitate regeneration of the user data responsive to an error condition associated with at least one of the storage devices.

3. The method of claim 1, wherein each of the N storage devices in the RAID array have the same total storage capacity.

4. The method of claim 1, further comprising generating a host level map structure that identifies the first data set as being stored to the N storage devices responsive to the storage of the respective portions of the first data set to the N storage devices, subsequently generating a RAID controller level map structure that identifies the first data set as being stored to the M storage devices responsive to the migration of the respective portions of the first data set to the M storage devices, wherein the host level map structure is not updated responsive to said migration.

5. The method of claim 4, further comprising issuing a host request for the first data set that identifies the first data set as being stored on the N storage devices based on the host level map structure, modifying the host request using the RAID controller level map structure to identify the M storage devices on which the first data set is stored, and retrieving the first data set from the M storage devices.

6. The method of claim 1, further comprising:
   storing a fourth data set from a host to the remaining N−M storage devices.

7. The method of claim 6, further comprising transitioning the remaining N−M storage devices to a reduced power mode responsive to access frequency of the fourth data set.

8. The method of claim 6, wherein a selected data set is distributed across the M storage devices with no portion of the selected data set being stored in the remaining N−M storage devices, and a second selected data set is distributed across the N storage devices so that a different portion of the second selected data set is stored in each of the N storage devices.

9. The method of claim 1, wherein the portions of the first data set are arranged as RAID stripe units and RAID parity units configured to detect and correct errors in the RAID stripe units during a subsequent data retrieval operation, and the migration of the first data set from the N storage devices to the M storage devices does not include a recalculation of the RAID parity units.

10. The method of claim 1, wherein the first data set is arranged in accordance with a first RAID architecture when stored across the N storage devices, and wherein the first data set is subsequently stored in accordance with a different, second RAID architecture when stored across the M storage devices.

11. An apparatus comprising:
   a RAID array having a total number N storage devices;
   a RAID controller configured to store a RAID data set across the N storage devices so that a different portion of the RAID data set is stored in each of the N storage devices, the RAID data set consisting of a first number less than N of user data stripe units and a second number less than N of parity data stripe units arranged to reconstruct user data of the first number of user data stripe units, the RAID controller further configured to identify a reduced number M storage devices of the N storage devices within the RAID array upon which data is to be concentrated where M<N, migrate selected portions of the data set to the M storage devices so that the remaining N−M storage devices of the RAID array do not store any portion of the data set, and transition the remaining N−M storage devices to a reduced power mode, the RAID controller further configured to store a first group of additional RAID data sets from a host to the M storage devices until a capacity limit is reached in relation to a total amount of data stored on at least one of the M storage devices and a predetermined threshold, transition the remaining N–M storage devices to a fully operational powered mode, store a second group of additional RAID data sets from a host to the remaining N–M storage devices, migrate at least one of the first group of additional RAID data sets from the M storage devices to the remaining N–M storage devices and migrating at least one of the second group of additional RAID data sets from the remaining N–M storage devices to the M storage devices so that the RAID data sets stored on the M storage devices have a relatively higher access frequency and the RAID data sets stored on the remaining N–M storage devices have a relatively lower access frequency.

12. The apparatus of claim 11, the RAID controller comprising a programmable processor with associated programming in a memory location executed by the processor to carry out the migration of the data set to the M storage devices and the transitioning of the remaining N–M storage devices to the reduced power mode.

13. The apparatus of claim 11, wherein the RAID controller is further configured to transfer the respective portions of the RAID data set from each of the N storage devices to return the RAID data set to the host prior to the migration of the RAID data set to the M storage devices, and to transfer the respective portions of the RAID data set from each of the M storage devices to return the RAID data set to the host after the migration of the RAID data set to the M storage devices.

14. The apparatus of claim 11, wherein the RAID controller is further configured to store a second RAID data set across the M storage devices without storing any portion of the second RAID data set to the remaining N–M storage devices while the remaining N–M storage devices remain in the reduced power mode.

15. The apparatus of claim 11, wherein the RAID controller stores the RAID data set in accordance with a RAID 5 architecture across the N storage devices, and wherein the RAID controller subsequently stores the RAID data set as a RAID 4 architecture across the M storage devices.

16. An apparatus comprising:
a RAID array of N storage devices where N is a plural number; and
a RAID controller comprising at least one programmable processor having programming stored in associated memory which, when executed by the at least one programmable processor, operates to store a self-contained RAID first data set received from a host device as a first number of user data stripe units and a second number of parity data stripe units across the N storage devices so that each of the N storage devices stores a different one of the user data stripe units or the parity data stripe units, the parity data stripe units configured to reconstruct user data from the respective user data stripe units, the RAID controller further configured to migrate selected ones of the user data stripe units and the parity data stripe units of the first data set to each of a subset M of the N storage devices where M<N, power down the remaining N–M storage devices, and subsequently store a second data set across each of the M storage devices, the programming when executed by the at least one programmable processor further operating to subsequently power up the remaining N–M storage devices in the RAID array responsive to a total amount of data stored in the M storage devices, migrate at least a third data set having a relatively high access frequency for storage solely by each of the M storage devices, migrate at least a fourth data set having a relatively low access frequency for storage solely by each of the M-N storage devices, and store a fifth data set across each of the N storage devices.

17. The apparatus of claim 16, wherein the RAID controller stores the first data set in accordance with a first selected RAID architecture across the N storage devices, and wherein the RAID controller subsequently stores the first data set in accordance with a different, second selected RAID architecture across the M storage devices.

18. The apparatus of claim 17, wherein the first selected RAID architecture is a RAID 5 architecture, and the second selected RAID architecture is a RAID 4 architecture.

19. The apparatus of claim 16, wherein each of the N storage devices comprises a rotatable recording disk.

* * * * *